(12) United States Patent
Yang et al.

(10) Patent No.: US 10,770,970 B2
(45) Date of Patent: Sep. 8, 2020

(54) FLYING CAPACITOR BASED VARIABLE VOLTAGE CONVERTER

(71) Applicant: Ford Global Technologies, LLC, Dearborn, MI (US)

(72) Inventors: Shuitao Yang, Canton, MI (US); Yan Zhou, Canton, MI (US); Lihua Chen, Farmington Hills, MI (US); Baoming Ge, Okemos, MI (US); Fan Xu, Novi, MI (US); Mohammed Khorshed Alam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 15/619,118

(22) Filed: Jun. 9, 2017

(65) Prior Publication Data

US 2018/0354372 A1 Dec. 13, 2018

(51) Int. Cl.
| | |
|---|---|
| *B60L 11/18* | (2006.01) |
| *H02M 3/158* | (2006.01) |
| *B60L 50/51* | (2019.01) |
| *B60L 15/00* | (2006.01) |
| *H02M 1/00* | (2006.01) |
| *H02M 7/5387* | (2007.01) |

(52) U.S. Cl.
CPC ........... *H02M 3/158* (2013.01); *B60L 15/007* (2013.01); *B60L 50/51* (2019.02); *H02M 1/00* (2013.01); *H02M 7/53873* (2013.01); *B60L 2210/10* (2013.01); *B60L 2210/40* (2013.01); *B60L 2240/526* (2013.01); *B60L 2240/527* (2013.01); *B60L 2240/529* (2013.01); *H02M 2001/0003* (2013.01)

(58) Field of Classification Search
CPC ........... B60L 11/1803; B60L 11/1818; H02M 7/53873; H02M 1/00; H02M 2001/0003; H02M 3/158
See application file for complete search history.

(56) References Cited

U.S. PATENT DOCUMENTS

| | | | |
|---|---|---|---|
| 7,061,777 B2 | 6/2006 | Zeng et al. | |
| 7,787,270 B2 | 8/2010 | NadimpalliRaju et al. | |
| 7,948,221 B2 * | 5/2011 | Watanabe | H02M 3/158 307/110 |
| 9,007,040 B2 * | 4/2015 | Ikeda | H02M 3/158 323/271 |

(Continued)

FOREIGN PATENT DOCUMENTS

WO    WO-2016111156 A1 *   7/2016   .............. H02M 1/08

*Primary Examiner* — Jared Fureman
*Assistant Examiner* — Emmanuel Dominique
(74) *Attorney, Agent, or Firm* — David B. Kelley; Brooks Kushman P.C.

(57) ABSTRACT

A powertrain for a vehicle may include a variable voltage converter (VVC), and a controller. The VVC may include an inductor, a bus capacitor and a flying capacitor. The controller may be configured to, in response to a power demand signal exceeding a threshold, modulate switches of the VVC such that an inductor current created by a collapsing field of the inductor is directed into the flying capacitor or the bus capacitor such that a bus capacitor voltage exceeds a flying capacitor voltage, and in response to the power demand signal dropping below the threshold, modulate switches such that the flying capacitor and the bus capacitor are coupled in parallel.

18 Claims, 6 Drawing Sheets

(56) References Cited

U.S. PATENT DOCUMENTS

| | | | |
|---|---|---|---|
| 9,866,113 B1* | 1/2018 | Assaad | H02M 3/07 |
| 10,003,264 B2* | 6/2018 | Uenaka | H02M 1/08 |
| 2005/0174098 A1* | 8/2005 | Watanabe | H02M 3/07 |
| | | | 323/282 |
| 2009/0039947 A1 | 2/2009 | Williams | |
| 2012/0126764 A1* | 5/2012 | Urakabe | H02M 3/07 |
| | | | 323/282 |
| 2017/0271989 A1* | 9/2017 | Ikeda | H02M 3/07 |

* cited by examiner

FLYING CAPACITOR BASED VARIABLE VOLTAGE CONVERTER

TECHNICAL FIELD

This application is generally related to a DC/DC converter having a flying capacitor configured to provide an increased voltage to an electric machine during a propulsion mode of an electric vehicle.

BACKGROUND

Electrified vehicles (EVs) including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication.

SUMMARY

A powertrain for a vehicle may include a variable voltage converter (VVC), and a controller. The VVC may include an inductor, a bus capacitor and a flying capacitor. The controller may be configured to, in response to a power demand signal exceeding a threshold, modulate switches of the VVC such that an inductor current created by a collapsing field of the inductor is directed into the flying capacitor or the bus capacitor such that a bus capacitor voltage exceeds a flying capacitor voltage, and in response to the power demand signal dropping below the threshold, modulate switches such that the flying capacitor and the bus capacitor are coupled in parallel.

A method of controlling a powertrain converter includes directing current into an inductor of the converter to create a field, and then in response to a power demand signal exceeding a threshold, collapsing the field to flow a charge to a flying capacitor to boost a voltage of a bus capacitor such that the voltage of the bus capacitor voltage exceeds a voltage of the flying capacitor.

A vehicle includes an electric machine, a variable voltage converter (VVC), and a controller. The electric machine may be configured to propel the vehicle. The VVC may include an inductor, a bus capacitor and a flying capacitor. The controller may be configured to modulate switches of the VVC such that an inductor current created by a collapsing field of the inductor is boosted by the flying capacitor and directed into the bus capacitor at a drive voltage of the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A typical drive system for EVs/HEVs may include a direct current (DC) power source (i.e., high-voltage battery), a variable voltage converter (VVC), an inverter and an electric machine. The VVC may be a bi-directional boost converter that is configured to boost a voltage of the battery to an operating voltage of the motor/generator and inverter. A practical aspect of the typical drive system includes, as an increase of power is demanded, multiple power devices connected in parallel may be needed to output higher current/higher power to meet the demand. The connection of multiple power devices in parallel may result in a current sharing problem between the power devices connected in parallel. A result of the current sharing problem is that system efficiency may be compromised. Also, in the typical drive system, an output voltage range of a boost converter may then be limited as the efficiency is decreased based on a boost ratio, that is High-Voltage DC voltage (Vdc) to the input battery (Vb) (e.g., Vdc/Vb>2). To improve the electric powertrain (e-drive) performance, a VVC that features a wide output voltage range is desired.

Figure 1:
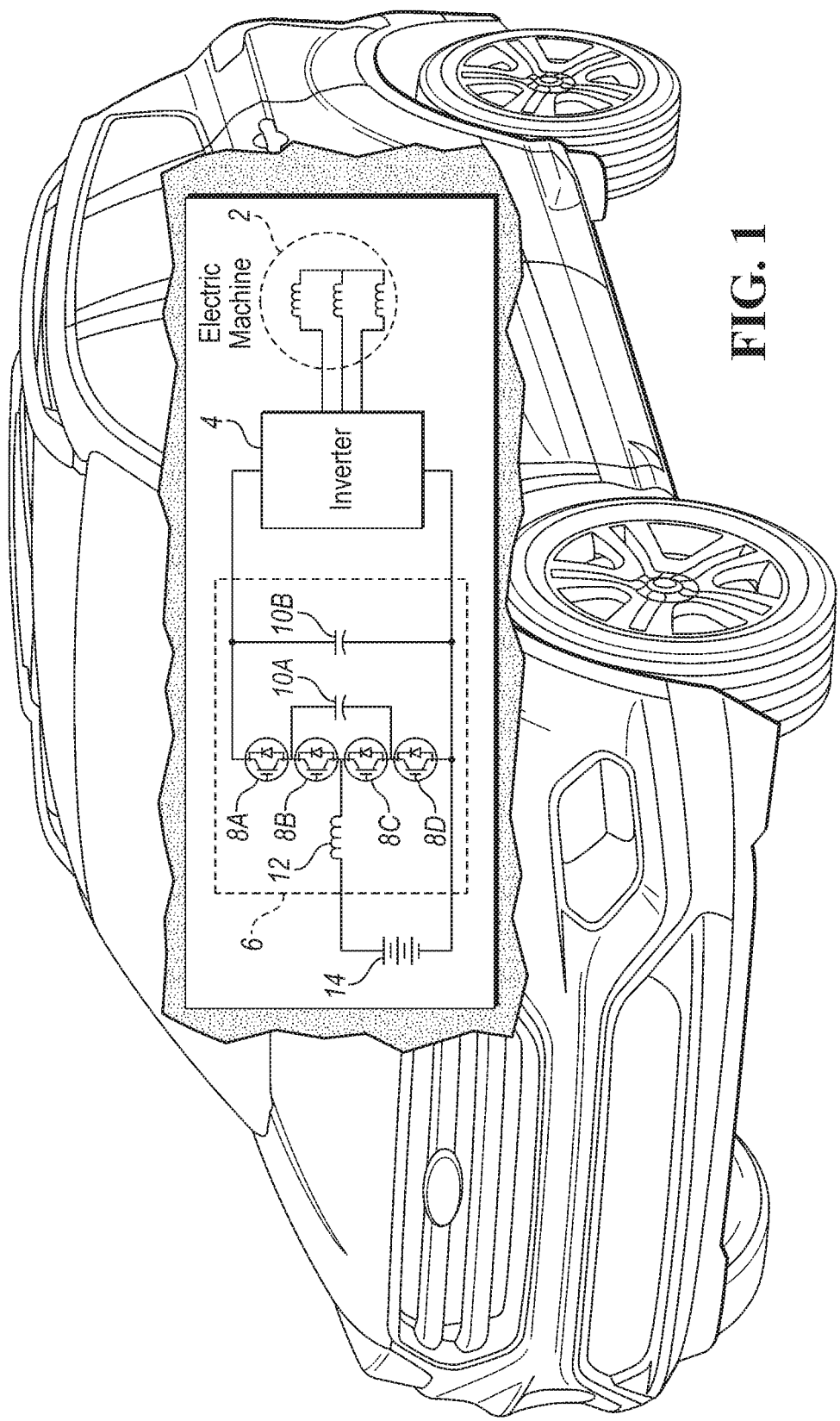
FIG. 1 is a diagram of an electrified vehicle with an electric machine, an inverter, and a variable voltage converter that is configured to reduce a current ripple during charging of the electric vehicle from an AC grid.

FIG. 1 depicts a hybrid electric vehicle illustrating internal electric powertrain components configured to flow a current through windings of an electric machine 2 by operating the electric machine inverter 4 via a Variable Voltage Converter (VVC) 6 (e.g., a DC/DC converter) and a high voltage traction battery 14. The VVC includes power devices 8, capacitors 10, and an inductor 12. The VVC may be operated in at least three propulsion modes including a pass-through mode, a low-boost mode, and a high-boost mode.

In a first mode of operation (i.e., pass-through mode), the power devices 8A, 8B, and 8D are turned on and power device 8C is configured to produce an open circuit such that capacitors 10A and 10B are generally coupled in parallel. Here, a DC bus voltage (Vdc) to the inverter 4 is substantially at the voltage of the battery 14 (Vb) and the voltage (Vf) across the flying capacitor 10A (i.e., Vdc=Vf=Vb).

The second mode of operation is the low-boost mode in which power devices 8A and 8D remain on, and power devices 8B and 8C are modulated (e.g., pulse width modulation (PWM)) as a conventional boost converter and the output capacitors 10A and 110B are coupled in parallel. Here, a DC bus voltage (Vdc) to the inverter 4 is larger than the voltage of the battery 14 (Vb) based on the duty cycle ratio. For example, Vdc may equal Vb/D in which D is the duty cycle ratio of the power device 8B on time.

The third mode of operation is the high-boost mode in which power devices 8A, 8B, 8C, and 8D are all modulated (e.g., PWM). During operation in this mode, the DC bus voltage (Vdc) may be greater than a maximum voltage capable of being produced in the second mode. For example, the DC bus voltage (Vdc) may be boosted to twice the battery voltage (Vb) divided by the duty cycle ratio (D) (i.e., Vdc=2 Vb/D). This would produce a flying capacitor voltage (Vf) of the battery voltage (Vb) divided by the duty cycle ratio (D) (i.e., VP=Vb/D), therefore, Vf may be controlled to be half of the DC bus voltage (Vdc). During operation in this mode, an inductor ripple frequency ($f_L$) may be a multiple of the switching frequency ($f_{sw}$) (e.g., $f_L=2f_{sw}$). Here, the equivalent switching frequency for the inductor is double and therefore the inductor size and cost may be reduced. One advantage of the third mode is that it is possible to produce an output with greater efficiency than the second mode is able to, however the second mode has a greater bus capacitance and therefore may have lower ripple at the output voltage.

Figure 2:
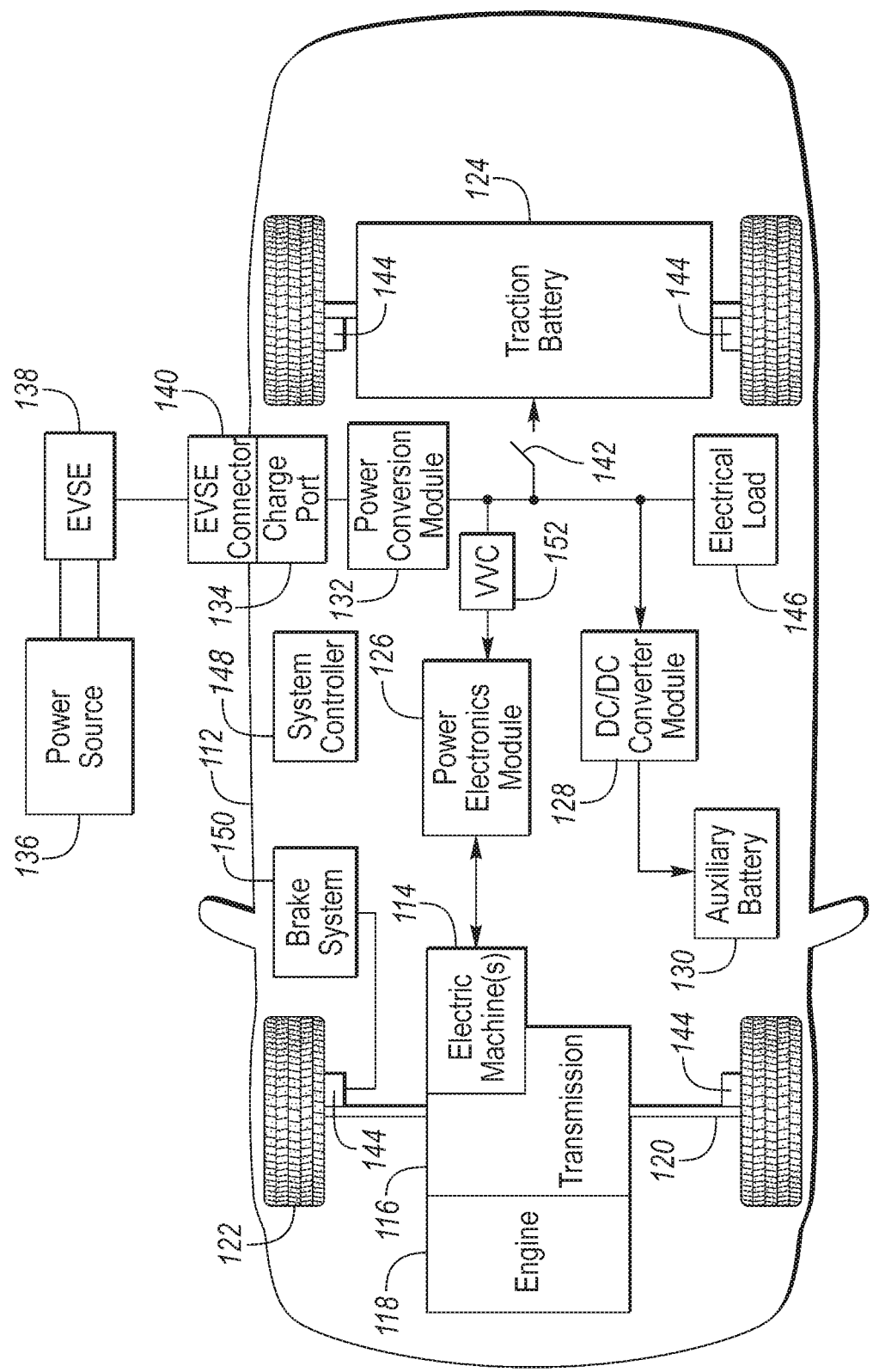
FIG. 2 is a diagram of a hybrid vehicle illustrating typical drivetrain and energy storage components including a variable voltage converter.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 24 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V_{dc}^*$. The VVC controller may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
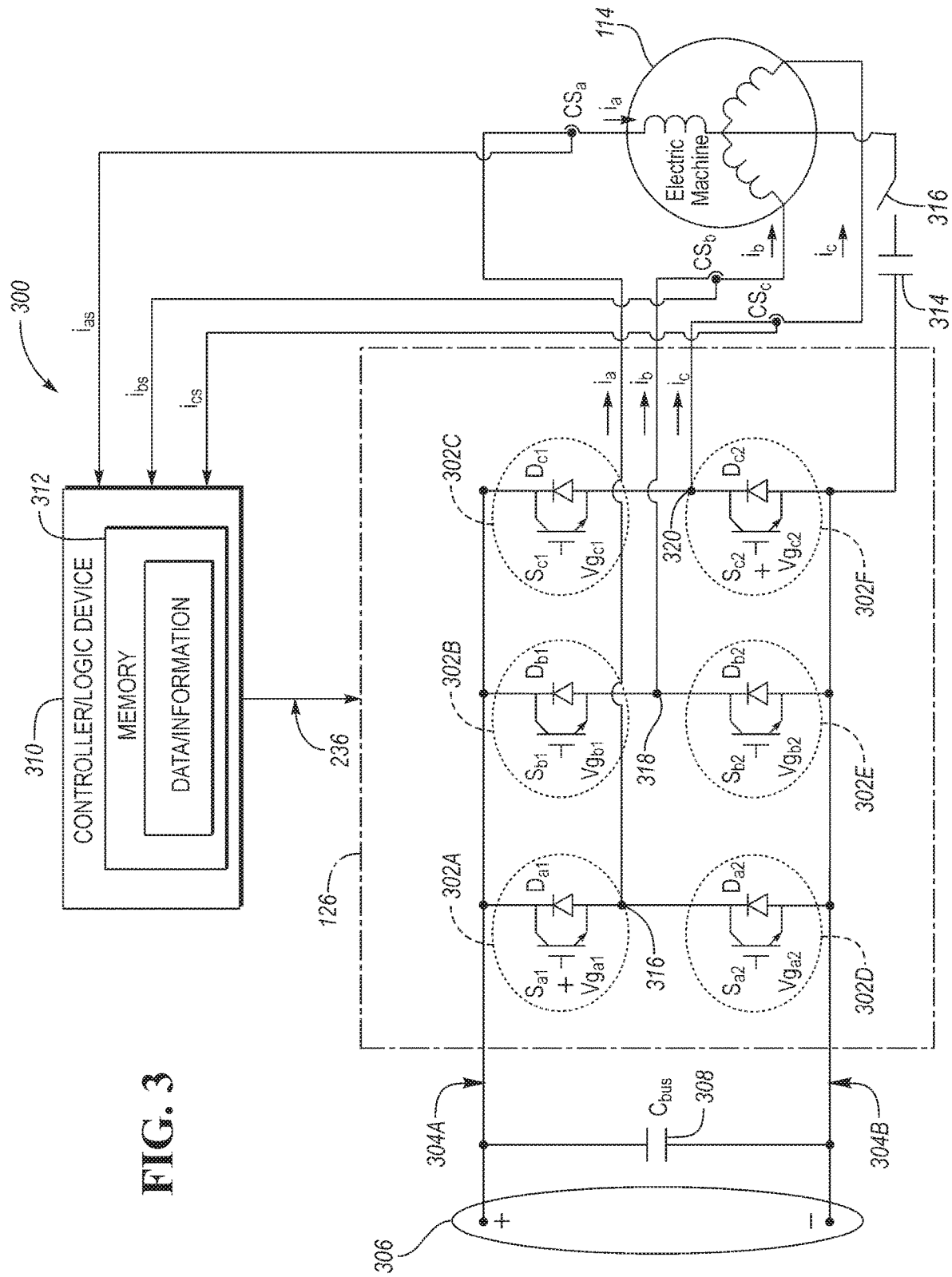
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and ic to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3, However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OH state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as insulated Gate Bipolar Junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
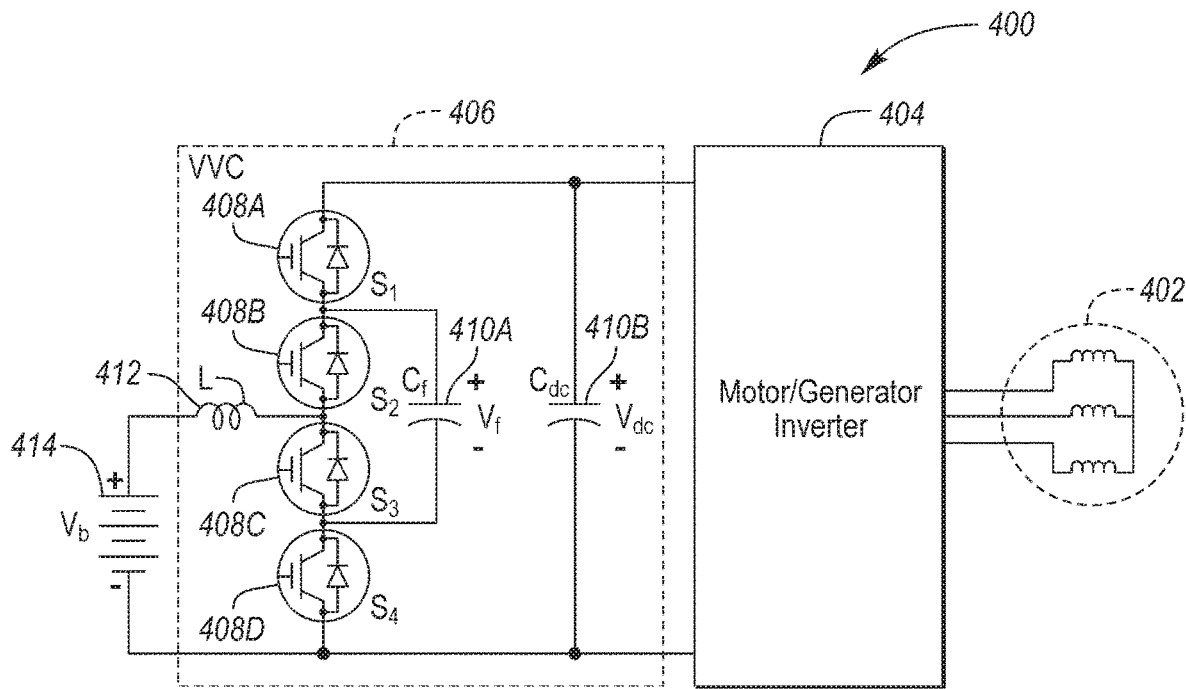
FIG. 4 is a diagram of a hybrid vehicle powertrain including a traction battery, inverter, and a variable voltage converter having a flying capacitor.

FIG. 4 is a diagram of a hybrid vehicle powertrain including an electric machine 402, an inverter 404 (e.g., a DC/AC converter), a variable voltage converter (VVC) 406 and a battery 414. The VVC includes 4 power devices (408A, 408B, 408C, and 408D), a flying capacitor ($C_f$) 410A, and a DC bus capacitor ($C_{dc}$) 410B. and a boost inductor 412. The VVC 406 may be operated in at least three modes including a pass-through mode, a low-boost mode, and a high-boost mode.

In the first mode of operation (i.e., pass-through mode), the power devices 408A, 408B, and 408D are turned on and power device 408C is configured to produce an open circuit such that capacitors 410A and 410B are generally coupled in parallel. Here, a DC bus voltage (Vdc) to the inverter 404 is substantially a voltage of the battery 414 (Vb) and the voltage across the flying capacitor (VD 410A (i.e., Vdc=Vf=Vb).

The second mode of operation is the low-boost mode in which power devices 408A and 408D remain on, and power devices 408B and 408C are modulated (e.g., Pulse Width Modulation (PWM)) by a controller similar to modulation of a conventional boost converter and the output capacitors 410A and 410B are coupled in parallel. Here, a DC bus voltage (Vdc) to the inverter 404 is larger than the voltage of the battery 414 (Vb) based on the duty cycle ratio. For example, Vdc may equal Vb/D in which D is the duty cycle ratio of the power device 408B on time.

The third mode of operation is the high-boost mode in which power devices 408A, 408B, 408C, and 408D are all modulated (e.g., PWM). The modulation may use complimentary signals for high and low-side matched drivers, for example, the matched high-side and low-side drivers are S1 408A with S4 408D and S2 408B with S3 408C. In this example, the control signals for S1 408A and S4 408D may transition, in opposite directions, substantially at the same time, while the control signals S2 408B and S3 408C may transition, in opposite directions, substantially at the same time, but at a time different from the transition of S1 408A and S4 408D. Further, the control signals may include an offset or delay such that a DC path to ground is not created by having both high-side and low-side switches on at the same time. Also, some of the control signals may include a further delay as the turn-on and turn-off times may require more or less time.

In this high-boost operation mode, the DC bus voltage (Vdc) may be greater than a maximum voltage capable of being produced in the second mode (e.g., a conventional boost converter maximum boost). For example, the DC bus voltage (Vdc) may be boosted to twice the battery voltage (Vb) divided by the duty cycle ratio (D) (i.e., Vdc=2 Vb/D). This would produce a flying capacitor voltage (Vf) of the battery voltage (Vb) divided by the duty cycle ratio (D) (i.e., Vf=Vb/D), therefore, Vf may be controlled to be half of the DC bus voltage (Vdc). During operation in this mode, an inductor ripple frequency ($f_L$) may be a multiple of the switching frequency ($f_{sw}$) (e.g., $f_L=2f_{sw}$). Here, the equivalent switching frequency for the inductor is double and therefore the inductor size and cost may be reduced. One advantage of the third mode is that it is possible to produce an output with greater efficiency than the second mode is able to, however the second mode has a greater bus capacitance and therefore may have lower ripple at the output voltage.

This VVC 406 has a configuration that is based on a multilevel topology, therefore an advantage of VVC 406 is the ability to achieve an equal High Voltage DC bus voltage (Vdc) as a conventional boost converter while using power device that have a lower voltage rating. This is due to the power device being coupled in series so the breakdown voltage would be spread across all four power devices. Therefore, an IGBT with a lower voltage rating or possibly even a power MOSFET may be used for the switches/power devices to provide a cost/performance and efficiency improvement.

Further, VVC 406 has 3 different operating modes, i.e. pass-through mode, low boost mode and high boost mode, which features different voltage boost ratio (Vdc/Vb). Therefore, there are more degrees of freedom when configuring the system to increase system efficiency optimization, especially for systems that may need a high boost ratio.

And, a ripple frequency of the inductor 412 is typically 2 times the switching frequency, in other words, the equivalent switching frequency for inductor is double. Thereby further reducing the inductor size/cost.

Also, although the proposed VVC 406 has four power devices 408A-408D as compared to two power devices in a convention boost converter, the four power devices 408A-408D of VVC 406 permit fault-tolerant operation. For example, if S1 408A or S4 408D has a fault (e.g., a short circuit), the VVC 406 may still be operated in a pass-through mode or a low boost mode, such that a voltage boost of the battery voltage to a High Voltage DC bus voltage is still possible.

Figure 5:
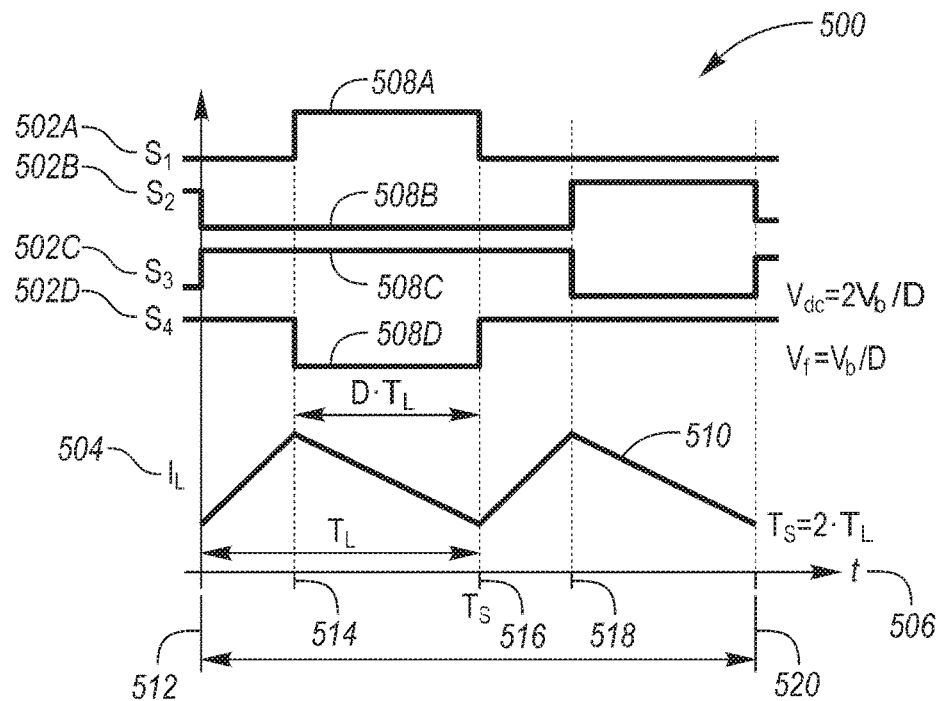
FIG. 5 is a graphical representation of control signals for switches of a Variable Voltage Converter and load current with respect to time.

FIG. 5 is a graphical representation of control signals 502 for the switches of a Variable Voltage Converter (VVC) (e.g., the VVC of FIG. 4) and inductor current 504 (e.g., current flowing to inductor 412) with respect to time 506. The control signals 502 include a first signal ($S_1$) 502A having a first profile 508A (e.g., control signal for switch 408A), a second signal ($S_2$) 502B having a second profile 508B (e.g., control signal for switch 408B), a third signal ($S_3$) 502C having a third profile 508C (e.g., control signal for switch 408C), and a forth signal ($S_4$) 502D having a forth profile 508D (e.g., control signal for switch 408D). The inductor current 504 (e.g., current flowing to inductor 412) with respect to time 506 is illustrated as a current profile 510. At a first time 512, the switches (e.g., 408B and 408C) for the flying capacitor (e.g., 410A) complementarily transition such that the high-side switch S2 (e.g., 408B) turns off and the low-side switch S3 (e.g., 408B) turns on, while the other high-side switch (e.g., 408A) is off (e.g., open circuit) and the low-side switch (e.g., 408D) is on (e.g., closed or short circuit). Thus current flows from the battery (e.g., battery 414) through inductor (e.g., 412) inducing a field in the inductor.

The inductor current 510 increases until at a second time 514, when the outside switches (e.g., 408A and 408D) for the flying capacitor (e.g., 410A) complementarily transition such that the high-side switch S1 (e.g., 408A) turns on and the low-side switch S4 (e.g., 408D) turns off, while the other high-side switch (e.g., 408B) is off (e.g., open circuit) and the other low-side switch (e.g., 408C) is on (e.g., closed or short circuit). This results in the field of the inductor (e.g., 412) collapsing and thereby flowing a current from the battery to inductor, then to the flying capacitor (e.g., 410A), onto the high voltage dc bus, and then back to battery.

At a third time 516, the outside switches (e.g., 408A and 408D) for the flying capacitor (e.g., 410A) complementarily transition such that the high-side switch S1 (e.g., 408A) turns off and the low-side switch S4 (e.g., 408D) turns on, while the inside high-side switch (e.g., 408B) is off (e.g., open circuit) and the inside low-side switch (e.g., 408C) is on (e.g., closed or short circuit). Thus the current flows from the battery (e.g., battery 414) through inductor (e.g., 412) inducing a field in the inductor.

Again, the inductor current 510 increases until at a fourth time 518, when the inside switches (e.g., 408B and 408C) for the flying capacitor (e.g., 410A) complementarily transition such that the high-side switch S2 (e.g., 408B) turns on and the low-side switch S3 (e.g., 408C) turns off, while the other high-side switch (e.g., 408A) is off (e.g., open circuit) and the other low-side switch (e.g., 408C) is on (e.g., closed or short circuit). This results in the field of the inductor (e.g., 412) collapsing and thereby flowing a current through flow from the battery (e.g., 414) to the inductor (e.g., 412), then to the flying capacitor (e.g., 410A), and back to battery (e.g., 414).

This completes the cycle, as the control signals at time 512 are equal to the signals at time 520. Here, one cycle is from the first point in time 512 to the second point in time 520. An average characteristic is determined over one cycle, for example, an average inductor current 504 is measured over one cycle, and an average flying capacitor voltage and average bus capacitor voltage are measured over one cycle (e.g., time 512 to time 520). FIG. 5 is a graphical representation of a dynamic system that changes over time as shown by the changing control signals that result in changing inductor current. Contrary to dynamic operation, a steady-state operational mode is when the control signals do not change while in that mode. For example, FIG. 5 illustrates one cycle of a high boost mode of operation in which modulating switches boost an output voltage. When the VVC is turned to a pass-through mode, switches S1, S2, and S4 (408A, 408B, and 408D) are turned on while switch S3 (408C) is turned off and all switches are maintained in those conducting states, this may be referred to as the pass-though steady-state mode of operation.

Figure 6:
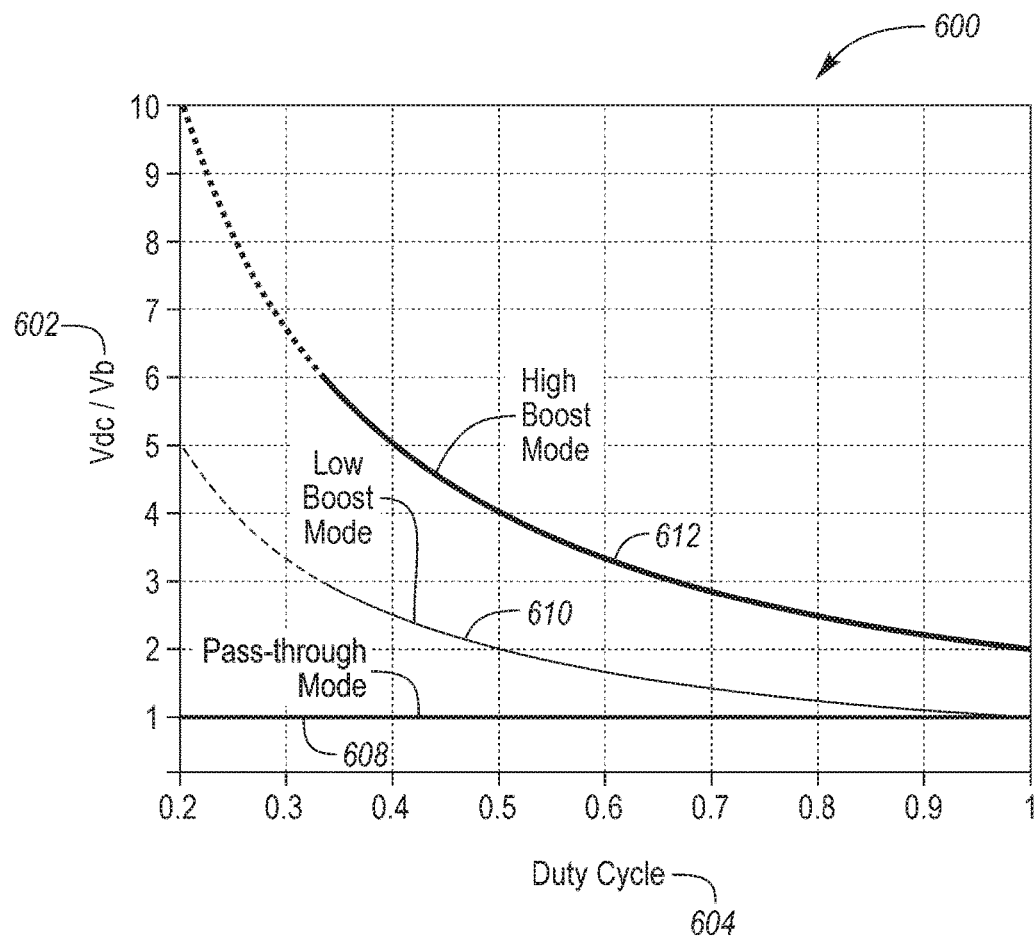
FIG. 6 is a graphical representation of a Variable Voltage Converter voltage boost ratio with respect to duty cycle.

FIG. 6 is a graphical representation 600 of a Variable Voltage Converter voltage boost ratio 602 with respect to duty cycle 604. In this illustration, the VVC voltage boost ratio (Vdc/Vb) during the three different operating modes of a VVC (e.g., VVC 406). This illustrates that there are more degrees of freedom to select an operating mode for system efficiency optimization. The first profile 608 illustrates a unity gain pass-through mode. The low boost mode as shown by the second profile 610, illustrates an operating principle that is similar to a conventional boost converter. Here, as the duty cycle decreases thereby increasing the boost ratio, either the converter efficiency decreases dramatically or it is not feasible to output desired voltage with boost ratio too high (e.g. >5) due to an ESR of inductor. However, in the high boost mode as shown by the third profile 612, the boost ratio 602 doubles when compared with the low-boost mode profile 610 at the same duty cycle. Thus, the output voltage can be boosted to a much higher level.

Figure 7:
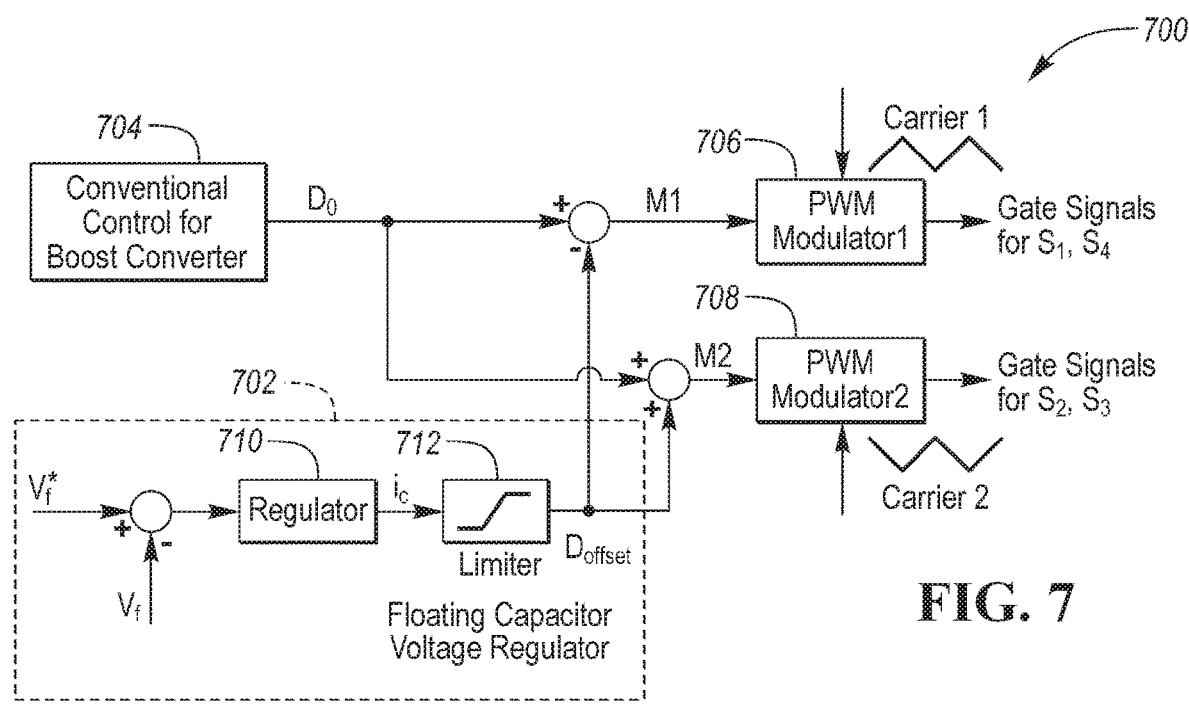
FIG. 7 is a flow diagram of a control system for a Variable Voltage Converter to channel reactive power to a balancing capacitor.

FIG. 7 is a flow diagram of a control system 700 for a Variable Voltage Converter to channel reactive power to a balancing capacitor. Here a conventional boost converter control block 704 generates a reference signal $D_0$ that includes a duty cycle of a PWM signal. The reference signal is combined with a signal from a floating capacitor offset 702. The floating capacitor offset 702 first compares the floating capacitor voltage ($V_f$) with a floating capacitor reference voltage ($V_f^*$) which then is regulated by a regulator 710. The regulated output is bound by a limiter 712 and the output is combined with the reference signal $D_0$. The combination of the limiter output with the reference signal $D_0$ is performed twice. First the limiter output is added with the reference signal $D_0$ to create a gate signal for the outer flying capacitor switches (e.g., S1 and S4). The gate signal is modulated according to a first carrier to create the S1/S4 gate signal. Next the limiter output is subtracted from the reference signal $D_0$ to create a second gate signal for the inner flying capacitor switches (e.g., S2 and S3). This gate signal is modulated according to a second carrier to create the S2/S3 gate signal. The first and second carrier signals may be the same carrier or may be associated or related based on a delay. This control algorithm for a VVC in high boost mode, where both the High Voltage DC bus voltage Vdc and floating capacitor voltage Vf are controlled, has been verified by simulation.

In summary, FIG. 7 shows a control method for a VVC in a high boost mode. Basically there are two control objectives in this high boost mode; First, to control the output bug voltage Vdc to follow the reference voltage per the requirement of motor/generator inverter. Second, to control the floating capacitor voltage Vf to be generally half of Vdc. Further, the two PWM carriers, carrier 1 and carrier 2 may be in phase or output of phase. And the conventional control for boost control could be any existing control methods, that may regulate the output voltage for a boost converter, including single voltage closed-loop control, voltage and current double-loop control, analog or digital control methods.

Figure 8:
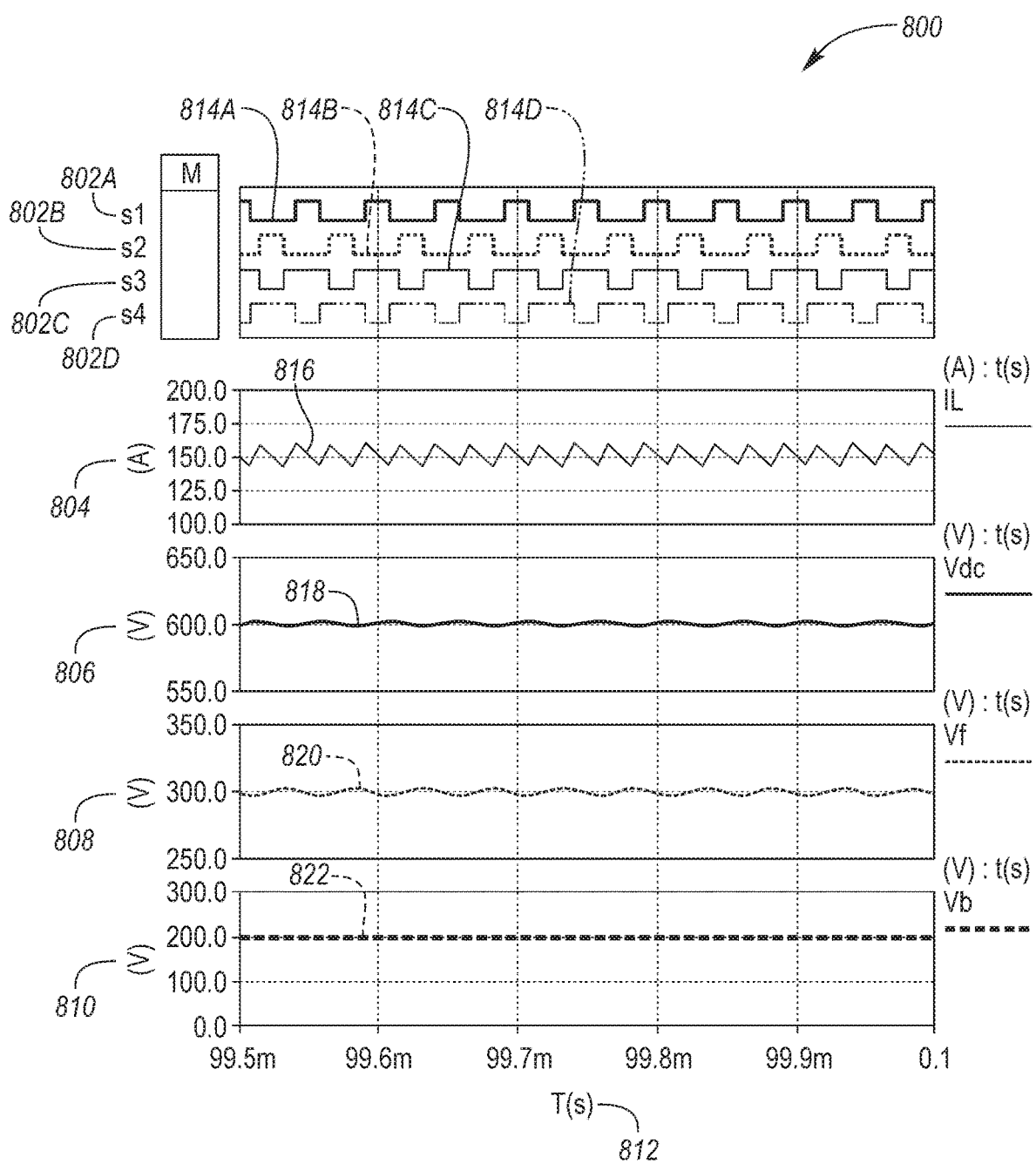
FIG. 8 is a graphical representation of control signals for switches of a Variable Voltage Converter and system electrical characteristics with respect to time.

FIG. 8 is a graphical representation 800 of control signals 802 for switches of a Variable Voltage Converter and system electrical characteristics (804, 806, 808, and 810) with respect to time 812. FIG. 8 is simulation waveforms for a VVC (e.g., 406) operating in a high boost ratio mode are shown. In the simulation, the reference voltage for floating capacitor voltage $V_f^*$ is 300V, and the reference voltage for HV DC Vdc is 600V. The inductor current 804 has a profile 816 which is a saw-tooth pattern similar to the profile 510 of FIG. 5. The DC bus voltage 806 has a profile 818 having a ripple at the switching frequency, the flying capacitor voltage 808 has a profile 818 that also has a ripple at the switching frequency, and based on the capacitance of the flying and DC bus capacitors, the DC bus voltage 810 has a profile 822 that is substantially constant.

The control signals 802 include a first signal ($S_1$) 802A having a first profile 814A (e.g., control signal for switch 408A), a second signal ($S_2$) 802B having a second profile 514B (e.g., control signal for switch 408B), a third signal ($S_3$) 802C having a third profile 814C (e.g., control signal for switch 408C), and a forth signal ($S_4$) 802D having a forth profile 814D (e.g., control signal for switch 408D). The inductor current 804 (e.g., current flowing to inductor 412) with respect to time 812 is illustrated as a current profile 816. Like the switching waveforms for FIG. 5, in FIG. 8 at a first time, the switches (e.g., 408B and 408C) for the flying capacitor (e.g., 410A) complementarily transition such that the high-side switch S2 (e.g., 408B) turns off and the low-side switch S3 (e.g., 408B) turns on, while the other high-side switch (e.g., 408A) is off (e.g., open circuit) and the low-side switch (e.g., 408D) is on (e.g., closed or short circuit). Thus, current flows from the battery (e.g., battery 414) through inductor (e.g., 412) inducing a field in the inductor. After which the field is collapsed to boost the voltage such that as the field is collapsed a voltage is applied to one of the capacitors, e.g., first the flying capacitor and then the DC bus capacitor.

Referring to FIGS. 5 and 8, an average system characteristic is determined over one cycle (e.g., time 512 to time 520). For example, an average of the flying capacitor voltage 808 and an average of the bus capacitor voltage 806 are measured over one cycle (e.g., time 512 to time 520). As shown in FIG. 8, in the high-boost mode, the average bus capacitor voltage 806 is greater than the average flying capacitor voltage 808 as the flying capacitor is used to boost the voltage applied to the bus capacitor, and the average flying capacitor voltage 808 is greater than the average battery voltage 810. While in the normal-boost mode, the flying capacitor is coupled in parallel with the bus capacitor, and the average bus capacitor voltage 806 is substantially equal to the average flying capacitor voltage 808, both the average bus capacitor voltage 806 and the average flying capacitor voltage 808 are greater than the average battery voltage 810. Lastly in the pass-through mode, the average bus capacitor voltage 806 is substantially equal to the average flying capacitor voltage 808 that is substantially equal to the average battery voltage 810. In this steady-state pass-though mode, power may be transferred from the battery to the electric machine, or from the electric machine to the battery.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain for a vehicle comprising:
   a variable voltage converter (VVC) including an inductor, a bus capacitor and a flying capacitor; and
   a controller configured to,
      in response to a power demand signal exceeding a threshold, modulate switches of the VVC such that an inductor current created by a collapsing field of the inductor is directed into the flying capacitor or the bus capacitor such that a bus capacitor voltage exceeds a flying capacitor voltage, and
      in response to the power demand signal dropping below the threshold, modulate switches such that the flying capacitor and the bus capacitor are coupled in parallel.

2. The powertrain of claim 1, wherein the VVC is coupled between a traction battery and an electric drive unit.

3. The powertrain of claim 1, wherein the switches of the VVC include 4 switches coupled in series between a negative and positive output terminal of the VVC.

4. The powertrain of claim 3, wherein the switches of the VVC include a first switch coupled between a second switch and a positive output terminal, the second switch coupled between the first switch and a third switch, the third switch coupled between the second switch and a fourth switch, and the fourth switch coupled between the third switch and a negative output terminal.

5. The powertrain of claim 4, wherein the flying capacitor is coupled between a top junction between the first and second switch and a second junction between the third and fourth switch and the inductor is coupled between a positive input terminal and a middle point between the second and third switch.

6. The powertrain of claim 5, where the controller is further configured to, alternately flow the inductor current into the flying capacitor and bus capacitor coupled in series by the switches, or flow the inductor current into the bus capacitor, while the flying capacitor is coupled in series with the bus capacitor by the switches and bypassed by a diode.

7. The powertrain of claim 5, where the controller is further configured to, in response to a power demand signal transitioning to negative, couple the flying capacitor and the bus capacitor in parallel and operate, in a steady-state, the switches in a pass-through mode to flow charge, wherein the first, second and fourth switches conduct and the third switch is turned off.

8. The powertrain of claim 1, wherein the switches are insulated gate bipolar junction transistors (IGBTs) or metal oxide semiconductor field effect transistors (MOSFETs).

9. A method of controlling a powertrain converter comprising:
directing current into an inductor of the converter to create a field;
in response to a power demand signal exceeding a threshold, collapsing the field to flow a charge to a flying capacitor to boost a voltage of a bus capacitor such that the voltage of the bus capacitor exceeds a voltage of the flying capacitor; and
in response to a power demand signal dropping below the threshold, coupling the flying capacitor and the bus capacitor in parallel and directing charge into both the flying capacitor and the bus capacitor as the field collapses.

10. The method of claim 9 further comprising modulating switches of the converter by a controller to direct the current into the inductor and to collapse the field.

11. The method of claim 10, wherein the field collapses to flow a charge to the bus capacitor and the flying capacitor.

12. The method of claim 10 further including, in response to a power demand signal transitioning to negative, coupling the flying capacitor and the bus capacitor in parallel and operating, in a steady-state, the switches in a pass-through mode to flow charge.

13. A vehicle comprising:
an electric machine configured to propel the vehicle;
a variable voltage converter (VVC) including an inductor, a bus capacitor and a flying capacitor; and
a controller configured to modulate switches of the VVC in a boost mode such that an inductor current created by a collapsing field of the inductor is boosted by the flying capacitor and directed into the bus capacitor at a drive voltage of the electric machine and, in response to a power demand signal transitioning to negative, operate, in a steady-state, the switches in a pass-through mode to couple the flying capacitor and the bus capacitor in parallel and flow charge.

14. The vehicle of claim 13, wherein the switches of the VVC include a first switch coupled between a second switch and a positive output terminal, the second switch coupled between the first switch and a third switch, the third switch coupled between the second switch and a fourth switch, and the fourth switch coupled between the third switch and a negative output terminal.

15. The vehicle of claim 14, wherein the flying capacitor is coupled between a top junction between the first and second switch and a second junction between the third and fourth switch and the inductor is coupled between a positive input terminal and a middle point between the second and third switch.

16. The vehicle of claim 15, where the controller is further configured to, alternately flow the inductor current into the flying capacitor and bus capacitor coupled in series by the switches, or flow the inductor current into the bus capacitor, while the flying capacitor is coupled in series with the bus capacitor by the switches and bypassed by a diode.

17. The vehicle of claim 15, where the controller is further configured to, in response to the flying capacitor and the bus capacitor being coupled in parallel, operate, in a steady-state, the switches such that the first, second and fourth switches conduct and the third switch is turned off.

18. The vehicle of claim 13, wherein the switches are insulated gate bipolar junction transistors (IGBTs) or metal oxide semiconductor field effect transistors (MOSFETs).

* * * * *